United States Patent [19]
Seitz

[11] Patent Number: 5,438,935
[45] Date of Patent: Aug. 8, 1995

[54] RAILROAD CAR HATCH COVER MECHANISM WITH DUAL LATCH POSITIONS FOR SAFELY VENTING HATCH

[75] Inventor: Robert F. Seitz, Batavia, Ill.

[73] Assignee: Dev-Mark, Inc., Naperville, Ill.

[21] Appl. No.: 177,320

[22] Filed: Jan. 4, 1994

[51] Int. Cl.⁶ .............................. B61D 39/00
[52] U.S. Cl. ................. 105/377.11; 220/324; 114/203
[58] Field of Search ............ 220/314, 324 X, 334; 114/203 X; 105/377.07, 377.08, 377.11

[56] References Cited

U.S. PATENT DOCUMENTS

| | | | |
|---|---|---|---|
| 3,217,661 | 11/1965 | Kemp | 105/377 F |
| 3,848,912 | 11/1974 | Jensen et al. | 292/259 X |
| 4,000,703 | 1/1977 | Halliar | 105/377 E |
| 4,365,832 | 12/1982 | Treppler | 105/377 E X |
| 4,388,873 | 6/1983 | Carleton et al. | 105/377 E |
| 4,622,902 | 11/1986 | Miller | 105/377 E |

Primary Examiner—Robert J. Oberleitner
Assistant Examiner—S. Joseph Morano
Attorney, Agent, or Firm—Dorn, McEachran, Jambor & Keating

[57] ABSTRACT

A railroad car hatch cover assembly includes a ring which defines an opening in the railroad car body and a peripheral seal which is attached to the ring. There is a hatch cover for closing upon the ring and seal to close the car body opening. The hatch cover is hinged to the car body adjacent one side of the ring and on the opposite side there is a cam lock assembly which locks the hatch cover in a closing position upon the ring and seal. The cam lock assembly provides for three different locking positions. There is a full locked position in which the hatch cover is closed upon the ring and seal. There is an initial hatch cover release position in which the hatch cover is movable a limited distance away from the ring and seal. There is a full release position in which the cam lock permits full pivotal movement of the hatch cover about the hinge.

9 Claims, 3 Drawing Sheets

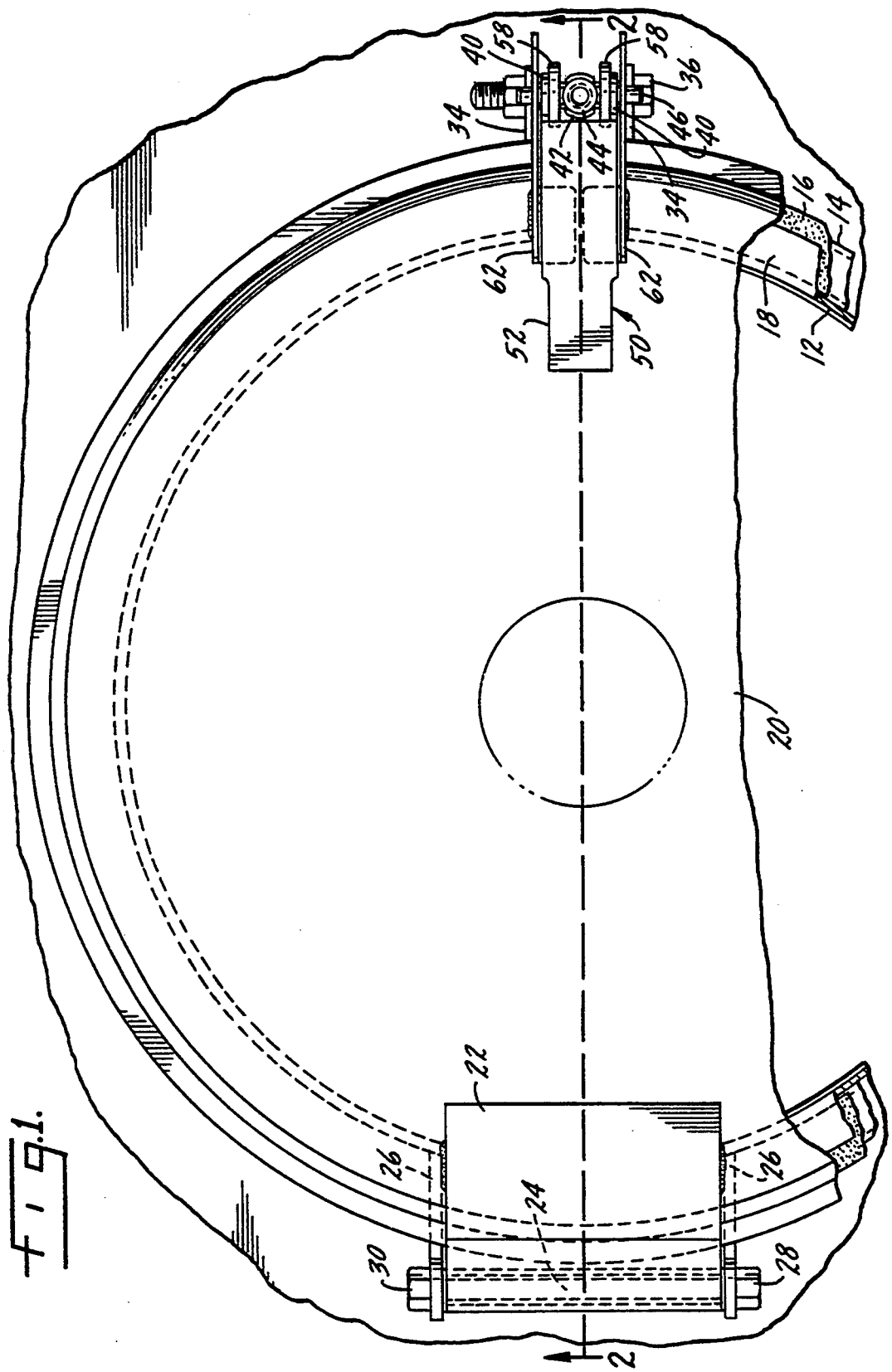

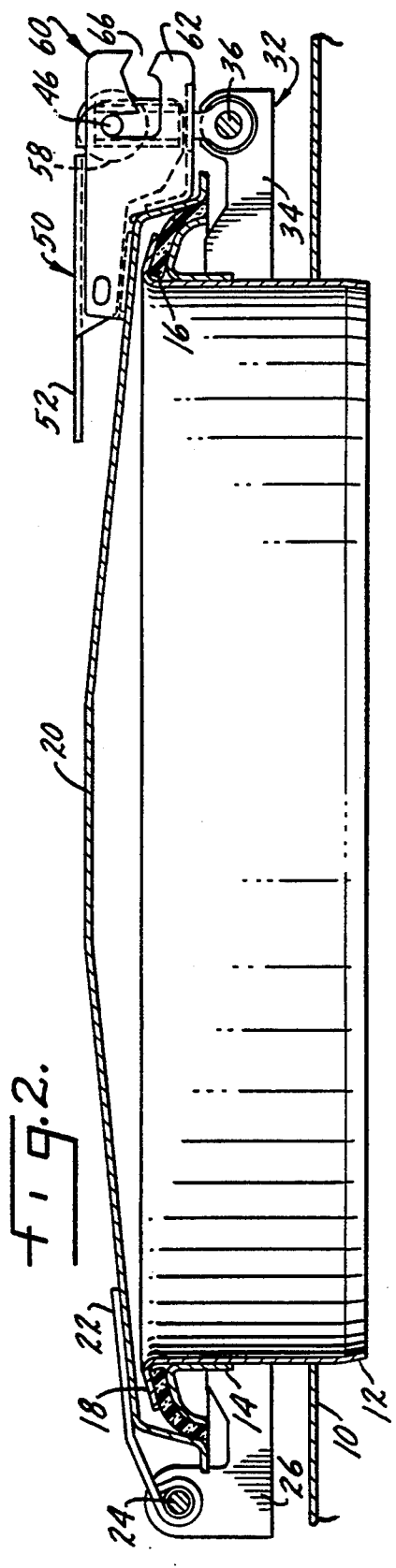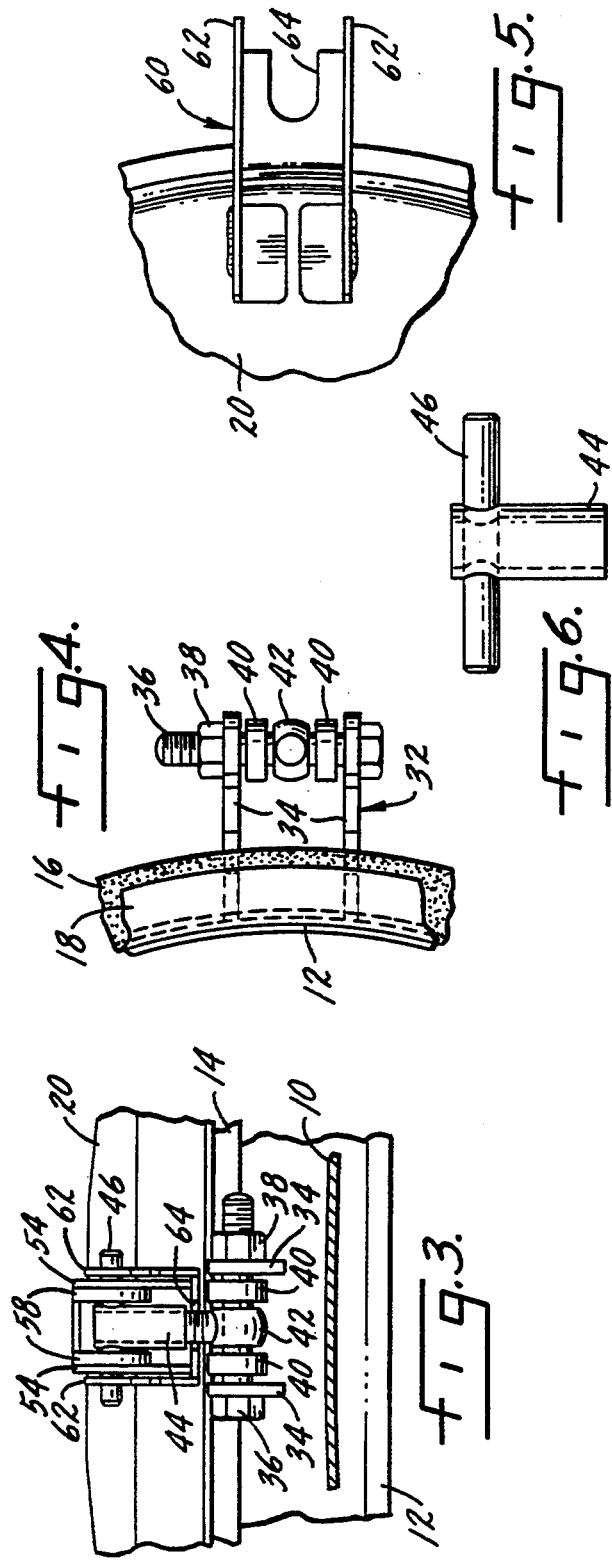

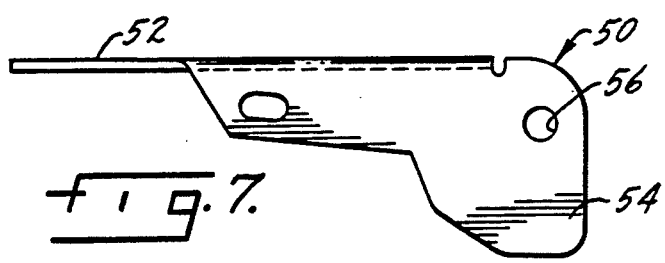
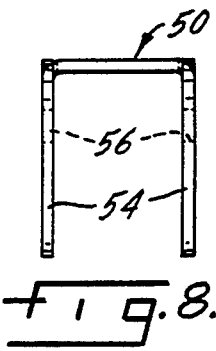
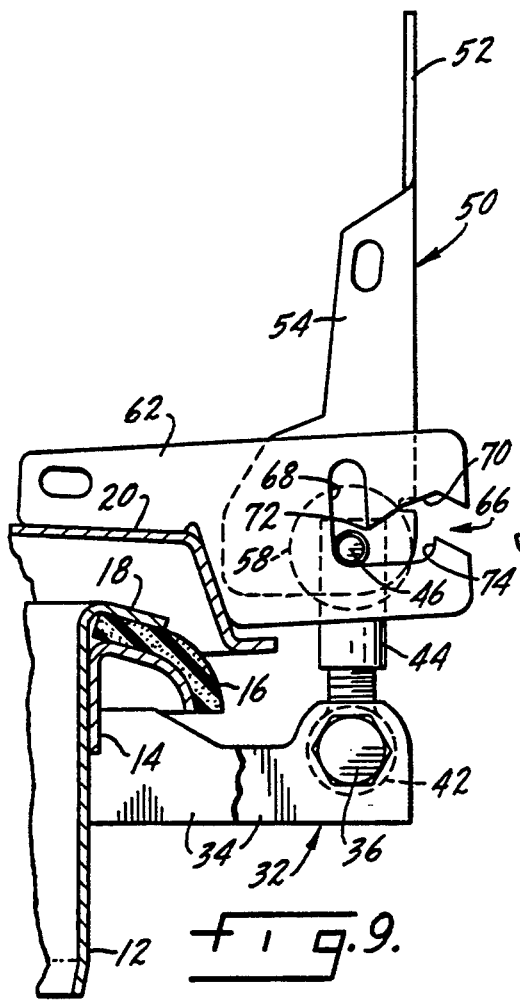
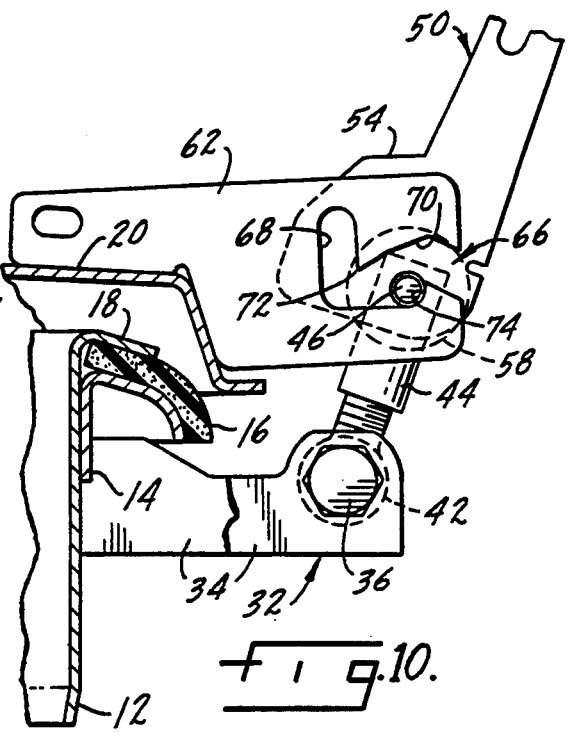

RAILROAD CAR HATCH COVER MECHANISM WITH DUAL LATCH POSITIONS FOR SAFELY VENTING HATCH

THE FIELD OF THE INVENTION

The present invention relates to hatch covers for railroad cars and particularly to a hatch cover useful with a covered hopper car. The hatch cover has a fully locked position in which the opening in the car body is sealed. There is an initially unlocked position in which the hatch cover is permitted limited movement relative to the car body opening to relieve any pressure build-up within the car interior. Finally, there is a fully released position for the hatch cover in which the cam lock assembly providing the lock for the hatch cover is fully released so that the hatch cover may be completely open to provide for access to the car body interior. The three described positions permit depressurization of the car body interior while still holding the hatch cover in a partially locked position, preventing the cover from abruptly flying to a full open position if there is pressure build-up within the car.

SUMMARY OF THE INVENTION

The present invention relates to hatch covers for railroad cars, particularly covered hopper cars, and more particularly to a cam lock assembly which permits depressurization of the car interior while still holding the hatch cover in a partially locked position.

Another purpose of the invention is an improved cam lock assembly for the use described which has a fully locked position in which the hatch cover is secured in position on the car body, a partially released position to permit depressurization of the car body interior without permitting full opening of the hatch cover, and a fully released position in which the hatch cover is pivoted away from the car body opening, permitting access to the interior compartment of the car.

Another purpose is an improved, simplified and reliable hatch cover locking assembly of the type described.

Another purpose is a hatch cover cam lock assembly in which initial movement of the lock assembly permits limited movement of the hatch cover relative to the car body, and further movement of the lock assembly disengages the hatch cover for complete access to the car body interior.

Other purposes will appear in the ensuing specification, drawings and claims.

BRIEF DESCRIPTION OF THE DRAWINGS

The invention is illustrated diagrammatically in the following drawings wherein:

FIG. 1 is a partial top plan view of the hatch cover assembly of the present invention;

FIG. 2 is a vertical section along plane 2—2 of FIG. 1;

FIG. 3 is an end view of the cam lock assembly;

FIG. 4 is a top view of the lock hinge butt, with the hatch cover in an open position;

FIG. 5 is a top view of the hatch cover extension;

FIG. 6 is an end view of the cam lock lever pin and the cam lock nut which mounts the pin;

FIG. 7 is a side view of the cam lock lever;

FIG. 8 is an end view of the cam lock lever;

FIG. 9 is an enlarged side view of the cam lock assembly showing the cam lock lever and the cover in the initial released position; and FIG. 10 is a side view, similar to FIG. 9, but showing the cam lock lever in position for subsequent movement to a full open position.

DESCRIPTION OF THE PREFERRED EMBODIMENT

The present invention relates to hatch covers for railroad cars, particularly covered hopper cars. In many uses of rail cars of this type, the interior of the car is pressurized, either deliberately so or sometimes because of an increase in the temperature of the car interior. When the hatch cover is opened to provide access to the compartment contents, if there is pressure within the car, a release of the hatch cover lock could cause the hatch cover to fly open abruptly, striking or startling a workman and causing him to fall from the car. The present invention is specifically directed to a release mechanism which permits the hatch cover to be opened to a limited extent to relieve any pressurization within the car interior, and after such pressure is released, further manipulation of the release mechanism permits the hatch cover to be moved to a full open position.

In the drawings, and particularly FIGS. 1 and 2, the car body top is indicated at 10 and there is an access opening therein in which is positioned a ring 12. Conventionally, the ring is welded to the car body top. Welded to the periphery of the ring 12 is a gasket retainer 14 upon which is mounted a sealing gasket 16. The ring 12 has an outwardly directed, slightly downturned flange 18 which overlies the exterior or top side of the gasket 16, with the gasket thus being sandwiched between two portions of the ring 12.

The hatch cover is indicated at 20 and has a hinge member 22 welded or otherwise secured at one side thereof. The hinge 22 is pivotally mounted on a pin 24 journaled in a hinge support 26. The hatch cover is pivotally moved about the pin 24 when moving between fully open and closed positions. The pin 24 may be in the form of a bole having a bolt head 28 and a nut 30 at the opposite end.

As particularly illustrated in FIG. 1, the cam lock assembly will be on the diametrically opposite side of the cover as the hinge. The cam lock assembly includes a lock hinge butt or support 32 which will be welded to the exterior of the ring 12. As particularly shown in FIG. 4, the support 32 is formed of two sides 34 with a bolt 36 passing through aligned openings in the sides. A nut 38 fastens the bolt to the sides 34. Mounted on the bolt are spacers 40 between which is positioned an eyebolt 42 having a threaded shank which receives a cam lock nut 44, see FIG. 6. The cam lock nut 44 mounts a pin 46 which forms an integral part of the cam assembly as described hereinafter. A weld may be used to fix the position of the pin relative to the cam lock nut 44.

The cam lock lever is indicated at 50 and is shown in detail in FIGS. 7 and 8. It includes a handle portion 52 and a pair of spaced sides 54, each of which has aligned openings 56 through which pin 46 will extend. As shown particularly in FIG. 3, pin 46 passes through spacers 58 located on opposite sides of the cam lock nut and directly adjacent the sides 54 of the cam lock lever.

A hatch cover extension is indicated generally at 60 and will be welded or otherwise attached to the top of the cover 20, as particularly shown in FIG. 5. The extension member 60 has spaced sides 62 which are positioned slightly outside of the cam lock lever sides 54 when the lever is engaged with the cam member, as illustrated in the end view of FIG. 3. There is an opening 64 in the bottom of the cam member to accommodate the upwardly extending cam lock nut 44 and the extension has a multidirectional slot 66 in each of its sides which will accommodate movement of pin 46 during the release operation of the cam lock assembly.

The slots 66 each have a generally vertical portion 68 and a generally horizontal portion 70. At the junction between the upper side of portion 70 and the outward side of portion 68 there is a first shoulder 72, whose function will be described hereinafter. The horizontal portion 70, in its bottom side, has a second shoulder 74, whose function again will be described hereinafter.

FIG. 1 shows the fully closed position of the hatch cover, with the cam lock assembly likewise being in a fully closed position. The first step in unlocking the hatch cover is to release any internal pressure, but yet keep the hatch cover in a partially locked position. To do this, the cam lock lever is rotated in a clockwise direction to the position illustrated in FIG. 9. This will permit the hatch cover to move a slight distance above the sealing gasket and the ring. In some instances the cover may actually be stuck to the gasket, in which case the hatch cover must be physically lifted in addition to moving the cam lock lever to the position of FIG. 9.

The cam lock lever cannot be rotated to a fully open position until it has first reached the position of FIG. 10 in which the pin 46 has been moved past the first shoulder 72. Thus, release of the cam lock assembly requires several distinct movements. First, the cam lock lever must be moved to the FIG. 9 position so that the pin will clear shoulder 72. This movement permits the hatch cover to be moved a limited vertical distance in an upward direction. The next step is to continue rotation of the cam lock lever in a clockwise direction, as illustrated in FIG. 10. In this instance, however, movement will be stopped when the pin 46 contacts the second shoulder 74. Further clockwise movement of the cam lock lever is prevented until the cover is physically pushed in a downward direction so that the pin can clear second shoulder 74. Once the pin has cleared this shoulder, the cam lock lever can then be rotated to its fully open position in which the pin 46 has passed outwardly through the horizontal portion 70 of the slot 66 of the cam member extension 60. The hatch cover may now be pivoted about its hinge to the full open position.

Of importance in the invention is the fact that the hatch cover cannot be released to a fully open position until it has first been moved to a pressure release position. Even then the hatch cover cannot be fully released until it has been through the pressure release position and then pushed in a downward closing direction to position the cam element or pin 46 for a full release movement of the cam lock lever.

Whereas the preferred form of the invention has been shown and described herein, it should be realized that there may be many modifications, substitutions and alterations thereto.

The embodiments of the invention in which an exclusive property or privilege is claimed are defined as follows:

1. A railroad car hatch cover assembly including a ring defining a car body opening, a peripheral seal attached to said ring, a hatch cover for closing upon said ring and seal to close the car body opening, a hinge adjacent said ring for pivotally mounting said hatch cover, and a cam lock assembly opposite said hinge for securing said hatch cover in a closing position upon said ring and seal, said cam lock assembly having a locked position in which said hatch cover is closed upon said seal, an initial hatch cover release position in which said hatch cover is movable a limited distance away from said ring and seal, and a full release position in which said cam lock assembly permits full pivotal movement of said hatch cover about said hinge, said cam lock assembly only being movable to a full release position by pushing down on the hatch cover after the hatch cover has first moved to the initial hatch cover release position.

2. The hatch assembly of claim 1 further characterized in that said cam lock assembly includes a support attached to said ring, a cam lock lever pivoted on said support, and an extension member attached to said cover, said extension member and cam lock lever having cooperating means thereon which define movement therebetween to provide said locked position, initial release position, and full release position.

3. The hatch cover assembly of claim 2 further characterized in that said cooperating means includes a pin on said cam lock lever and a slot in said extension member, with said pin riding in said slot.

4. The hatch cover assembly of claim 3 further characterized in that said slot has a first shoulder limiting pivotal movement of said lever about said support, and a second shoulder preventing full release movement of said lever about said support.

5. The hatch cover assembly of claim 4 further characterized in that said slot has a generally vertical portion and a generally horizontal portion, said first shoulder being adjacent said generally vertical portion, and said second shoulder being adjacent said generally horizontal portion.

6. The hatch cover assembly of claim 5 further characterized in that said generally horizontal slot portion extends outwardly through said extension member to permit positioning of said pin exteriorly of said extension member to provide for said full release position.

7. The hatch cover assembly of claim 6 further characterized in that said second shoulder is in the lower side of said generally horizontal slot portion.

8. The hatch cover assembly of claim 3 further characterized in that said extension member has a pair of spaced side elements, each of which has a said slot.

9. The hatch cover assembly of claim 3 further characterized in that said cam lock lever has a pair of spaced sides, with said pin extending through said sides.

* * * * *